United States Patent [19]

Coley

[11] 4,195,654
[45] Apr. 1, 1980

[54] ADDITIVE INJECTION VALVE

[75] Inventor: Ralph J. Coley, Richmond, Va.

[73] Assignee: The Firestone Tire & Rubber Company, Akron, Ohio

[21] Appl. No.: 905,076

[22] Filed: May 11, 1978

[51] Int. Cl.² ............................................. F16K 19/00
[52] U.S. Cl. .................................. 137/238; 137/315; 137/605
[58] Field of Search ............... 137/238, 315, 604, 605, 137/606, 613, 614.21

[56] References Cited

U.S. PATENT DOCUMENTS

| 3,716,346 | 2/1973 | Greene | 137/605 X |
| 4,026,324 | 5/1977 | King | 137/605 |

*Primary Examiner*—Robert G. Nilson

[57] ABSTRACT

A valve for introducing additive substances into a main process stream passing therethrough includes a valve body and a valve seat member carried in the body and having a bore therethrough communicable with the main process stream lumen. The valve seat member has a port communicable with the bore to permit flow of an additive into the bore. A first valve stem in the bore is moved to open and close the port for selectively permitting flow of additive through said port into the bore. A second valve stem moves relative to the valve seat member to open and close the bore for selectively injecting additive into the lumen. Additionally, the valve permits disassembly for cleaning without interrupting flow of the main process stream and provides for heating and cooling of the additive and the main process stream by the circulation of suitable medium through the valve body in a passageway disposed about the main process stream.

12 Claims, 3 Drawing Figures

ADDITIVE INJECTION VALVE

BACKGROUND OF THE INVENTION

This invention relates to valves for the introduction or injection of additives to a process stream. Such mixing of two process streams in one pipe line to provide a continuous flow source of process fluids is a commonly employed practice in the chemical industry. The additive ingredients are usually piped directly into the larger pipe, containing the main process stream, at a point located at the center of the pipe or at a radial extremity thereof, depending upon the flow rate and viscosity of both process fluids. Generally, injection at the center of the pipe is preferred in order to prevent the additive from collecting along the pipe wall and uncontrollably affecting the concentration of the additive in the main stream. Currently known injection equipment for this purpose is subject to frequent clogging which requires interruption of the main process flow followed by dismantling of the valve or related elements to remove the clogged condition.

DESCRIPTION OF THE PRIOR ART

One U.S. Pat. No. 3,716,346, which is exemplary of the prior art discloses a valve assembly for introducing a liquified gas into a flowing stream of liquid. The valve is cross-shaped and provides an inlet and outlet port in axial alignment for the flow of the primary liquid. Opposed lateral protrusions provide for supply of a secondary fluid (the liquified gas additive) directly into the central body of the valve through one leg and a movable shaft or valve stem provided in the opposite leg which traverses the valve body and adjustably controls the ingress of the additive within the valve body. Flow of the secondary fluid is through a channel provided in the one leg which terminates in a valve seat and is in turn communicable with the movable valve shaft in the opposite leg. Although the valve permits injection of the additive away from the edge of the main pipe, it contemplates only a single valve seat and valve plug. Thus, when the channel or valve seat become clogged, the main process flow must be stopped and the line drained before the side conduit can be removed for cleaning.

Other prior art devices have provided for addition of substances to a main stream without employing any valving at the injection port. Injection through multiple lines located at the periphery of a main stream, for instance, is described in U.S. Pat. No. 2,669,945; and the injection of one liquid directly into and against the flow of a primary stream to facilitate mixing is described in U.S. Pat. No. 3,726,297. Although perhaps neither apparatus would be as likely to clog as one wherein the additive entry can be controlled by a valve or other selectively restricted orifice, such systems require that the pressure of the additive be greater than that exerted by the main stream upon the area of injection, to insure entry of the additive in proper quantities.

Thus, valving or related apparatus providing variably controlled addition or injection of secondary streams to a main process stream and permitting the removal and cleaning of the secondary stream valving without interruption of the main process flow, is not known to me.

SUMMARY OF THE INVENTION

It is therefore an object of the present invetion to provide a novel additive injection valve for use in chemical processing and the like wherein it is desired to add an ingredient directly into a moving process stream. It is another object of the present invention to provide a novel additive injection valve which permits the addition of ingredients selectively across the diameter of the process stream at positions ranging from center-stream to a radial extremity thereof. It is yet another object of the present invetion to provide a novel additive injection valve having an additive flow channel of reduced cross-sectional area, thereby maximizing the velocity of the additive stream and decreasing the possibility of reverse-flow of the main process stream therein.

It is still another object of the present invention to provide a novel additive injection valve which permits facile removal and cleaning of the additive injection channel without interrupting flow of the main process stream. It is a further object of the present invention to provide a novel additive injection valve having at least two independent valve seats; one ouside of the main process stream channel and the other within the main process stream channel. It is still a further object of the present invention to provide a novel additive injection valve which can be jacketed for heating or cooling of both the main process stream and injection stream via the same medium.

Various other objects and advantages of the present invention will become apparent to those skilled in the art from the description which follows taken in conjunction with the attached drawings and the appended claims.

In general, an additive injection valve having a main process stream lumen therein and embodying the concept of the present invention includes a valve body and a valve seat member carried in the body having a bore communicable with the main process stream lumen and a port for supplying additive. A first valve stem is movable in the valve seat and adapted to close the port therein, and a second valve stem is movable for selective opening and closing of the bore in the valve seat member to the main process stream. Handles, or other suitable means, are provided for independently moving both the first and second valve stems. Moving the first valve stem permits flow of the additive through the port and into the bore, and moving the second valve stem selectively opens the bore to admit the additive to the lumen.

In addition to the components including valve bonnets, packing followers and yokes, the additive injection valve also provides for the heating or cooling of the main process stream and additive. To facilitate such temperature control, the valve body may have a passageway disposed about the main process lumen for circulation of a suitable medium.

BRIEF DESCRIPTION OF THE DRAWINGS OF THE PREFERRED EMBODIMENT

DESCRIPTION OF THE PREFERRED EMBODIMENT

Figure 1:
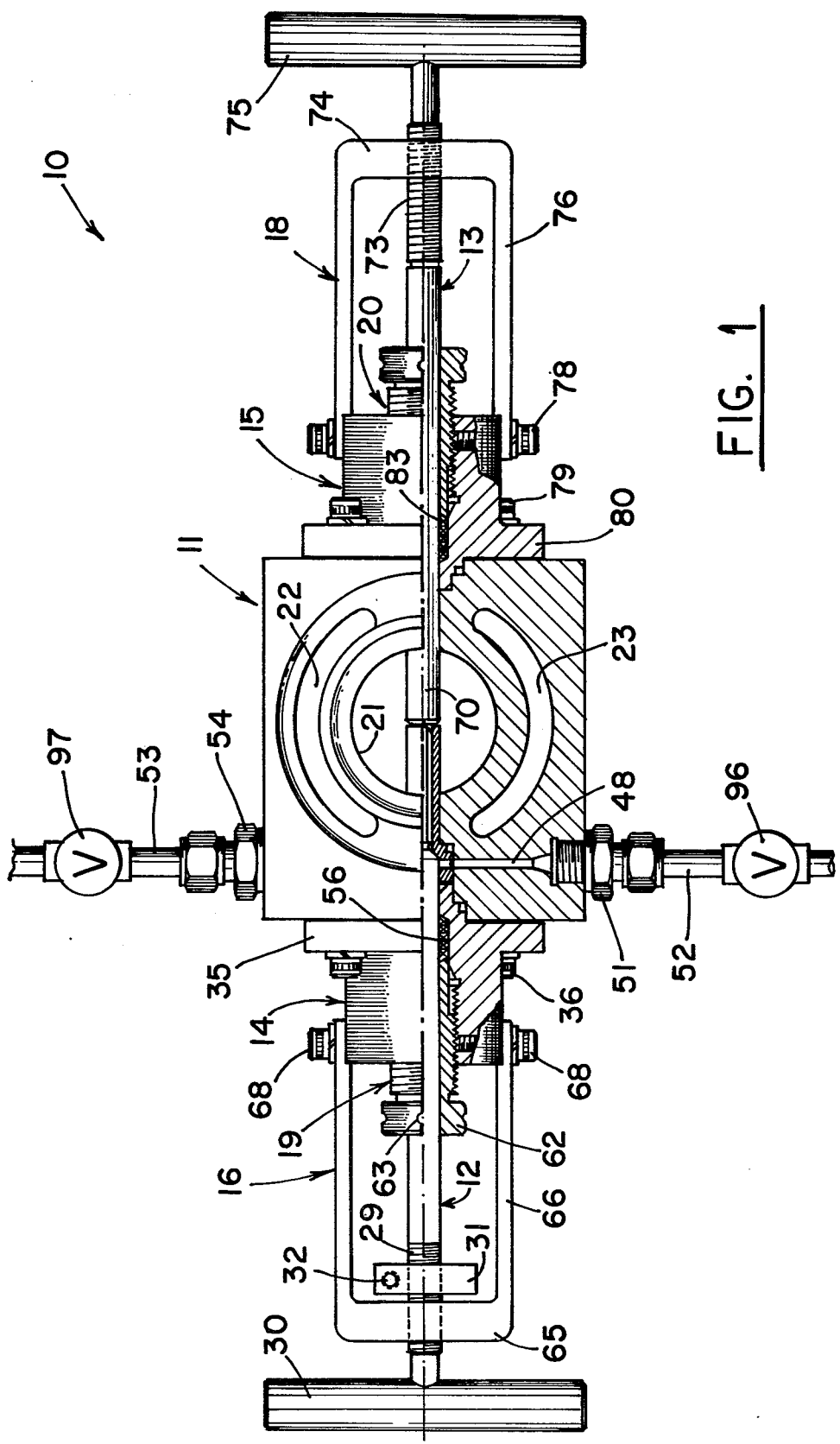
FIG. 1 is a side-elevation, partially in section, of a novel additive injection valve, embodying the concepts of the present invention.

A novel additive injection valve according to the concepts of the present invention is designated generally by the numeral 10 seen in FIG. 1 of the drawing. Basic components of the valve 10 include the main body, indicated generally by the numeral 11, and primary and secondary valve stems, indicated generally by the numerals 12 and 13, respectively. Additionally the valve 10 is provided with primary and secondary valve bonnets, generally 14 and 15, respectively; primary and secondary yokes, generally 16 and 18, respectively; and primary and secondary packing followers, generally 19 and 20, respectively. Components described herein can be fabricated from various metals and/or non-metallic materials which would be selected with consideration to the various processing conditions and ingredients which will pass through a particular valve 10.

The valve body 11 is provided with a large-diameter lumen 21 for through flow of the main process stream. Internal passageways 22 and 23 can be provided, preferably concentrically disosed about the main lumen 21, for circulation of various heating or cooling mediums for the temperature control of the main process stream and the injected additive. The passageways 22 and 23 are fed from suitable conduits, not shown, which communicate therewith via machined passageways in the valve body 11.

Figure 2:
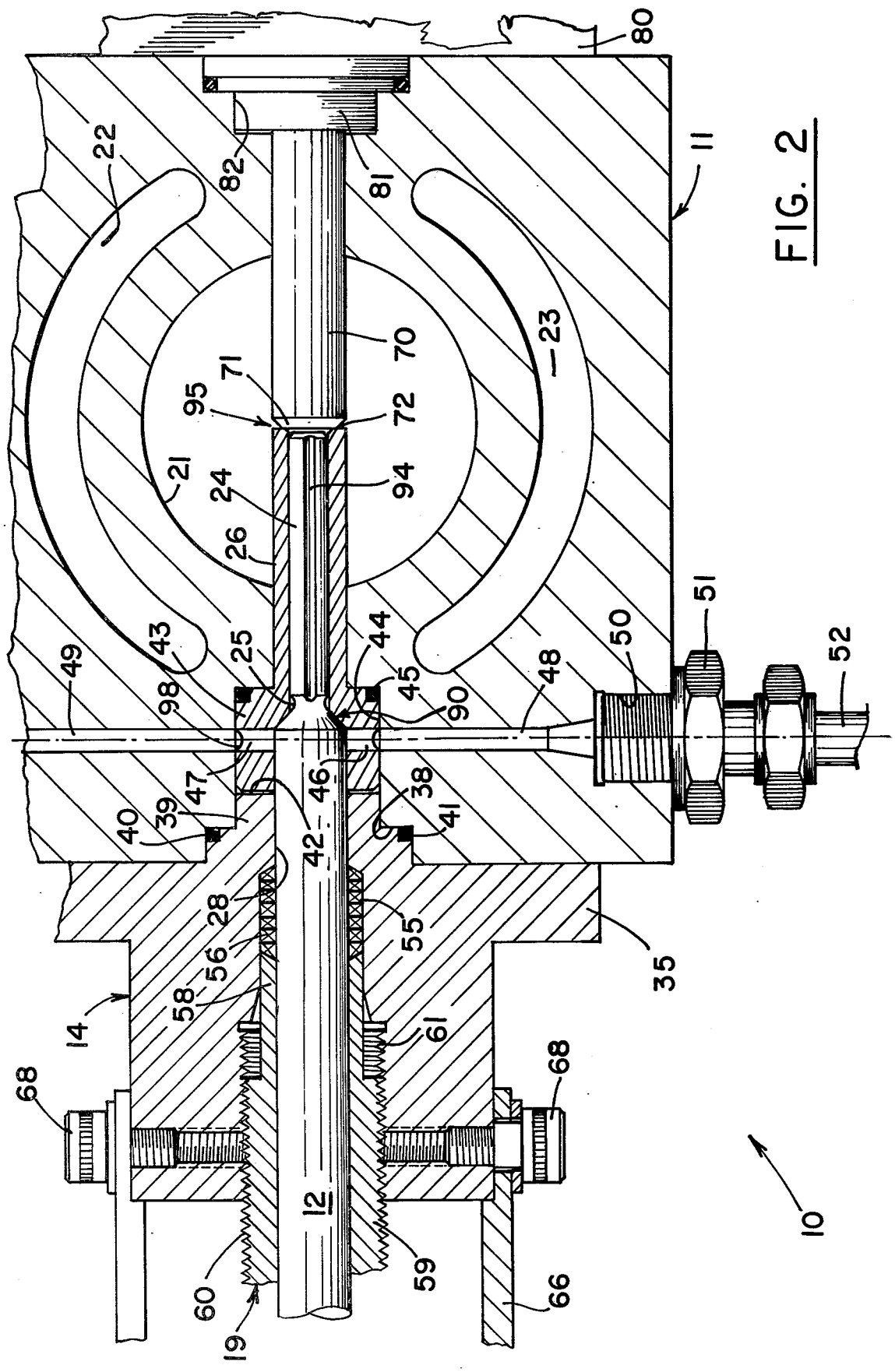
FIG. 2 is an enlarged fragmentary side-elevation, partially in section, depicting the passageways for the injected additive with the valve in the closed position providing no additive flow to the main stream.

Injection of the additive, as depicted in the drawings, occurs at the center of the main process stream by controlled separation of the primary and secondary valve stems 12 and 13 which shall be explained in greater detail hereinbelow. Referring particularly to FIG. 2, the primary valve stem 12 comprises a long, cylindrical shaft, terminating at its inner end in a narrow, reduced diameter and longitudinally grooved valve plug extension 24. The stem 12 passes through a mating machined bore 25 in a primary valve seat 26 and through a bore 28 in the valve bonnet 14. A portion of the outer end of the stem 12 is threaded, as at 29, for engagement with a mating threaded bore in the yoke 16 and is conveniently connected preferably proximate its end to a suitable handle 30 which is nonrotatably affixed thereto. A clamp nut 31, provided with a locking screw 32, threadably engages the stem at threads 29 adjustably to predetermine the extent of axial movement of the valve stem 12.

The valve bonnet 14 has an annular flange 35 which is connected to one side of the valve body 11 with cap screws 36. A machined recess 38 in the valve body 11 is provided for receipt of a stepped cylindrical leg 39, presented from the bonnet flange 35. A seal is effected by employing an O-ring 40 in shoulder 41 of the recess 38 against which the leg 39 reposes. The leading face 42 of leg 39 abuts against an enlarged base 43 of the primary valve seat 26. The valve body 11 is also recessed at 44 to receive the enlarged base 43 of valve seat 26 and a second O-ring 45 is employed to effect sealing therebetween.

The base 43 of valve seat 26 is preferably provided with an external circumferential groove 98, and at least one and preferably two or more radially extending ports 46 and 47 terminating in the large diameter portion of the bore 25 through which the valve stem 12 passes. The groove 98 provides a connection between injection passageways 48 and 49 with ports 46 and 47 without the need for precise alignment. As is clearly depicted in FIG. 2, the ports 46 and 47 are communicable with mating injection passageways 48 and 49, respectively, in the valve body 11. Considering the passageway 48 as representative, a threaded bore 50 is provided in the body 11 to receive a conventional pipe fitting 51 and injection additive feed line 52. A similar feed line 53 and fitting 54 can be provided for the passageway 49. By varying the configuration of the valve body and valve seat member, the additive feed line could, alternatively, be connected directly to the valve seat member 26.

Further referring to the valve bonnet 14 as depicted in FIG. 2, a larger, stepped bore 55 is provided therein concentric with the bore 28 for the valve stem 12 but extending only a portion of the axial extent of bonnet 14. Valve packing 56 is received in the bore 55 and is compressed around the stem 12 by the leg 58 of packing follower 19. The body 59 of packing follower 19 is threaded as at 60 for receipt in a threaded portion 61 of the bore 55 of valve body 14. The head 62 of packing follower 19 may be enlarged (FIG. 1) and have several radial holes 63 therein for insertion of a tool to tighten and loosen the follower 19 within bonnet 14.

The primary yoke 16 comprises a base 65, through which the valve stem 12 threadably passes, and a plurality of legs 66 (FIG. 2) which partially overlie the outer circumference of valve bonnet 14 and are secured thereto via cap screws 68. The yoke 16 generally provides for support and reciprocating movement of the valve stem 12 and, having open spaces between the legs 66, facilitates adjustment of the packing follower 19.

Referring again to FIG. 1, the secondary valve stem 13 and related components shall be discussed, however, in an abbreviated version as to components corresponding or similar to those described hereinabove relating to the primary valve stem 12. The valve stem 13 is different from the stem 12 in that the inner end of valve plug 70 portion of the former is not narrowed and grooved. The secondary stem 13 is, however, beveled at the tip forming a seating surface 71 which in turn forms a seal with the end seat portion 72 of valve seat 26 (FIG. 3).

The valve stem 13 thereafter passes through corresponding bores in the valve body 11, the valve bonnet 15 and the secondary packing follower 20, as described in conjunction with valve stem 12. The stem 13 is threaded at 73 and matingly engages a threaded bore provided in the base 74 of the secondary yoke 18 for axially moving the stem 13. The position, extent, and configuration of threads 29 and 73 of valve stems 12 and 13, respectively, is such that the valve stems 12, 13 are maintained within the valve bonnets 14 and 15 with provision for sufficient axial movement to effect the herein described functions. A handle 75 may also be provided for the stem 13, although a clamp nut, similar to clamp nut 31 is not required on the valve stem 13. Legs 76 of the yoke 18 are secured to the secondary bonnet 15, via cap screws 78, the bonnet being itself connected to the valve body 11 via cap screws 79, in the manner described in conjunction with the primary bonnet 14. The bonnet 15 may have a flange 80 and stepped cylindrical leg 81 received in a recess 82 machined within valve body 11 (see FIG. 2). Although the secondary valve stem 13 is provided with valve packing 83, a valve seat, corresponding to primary valve seat 26 is not employed.

Figure 3:
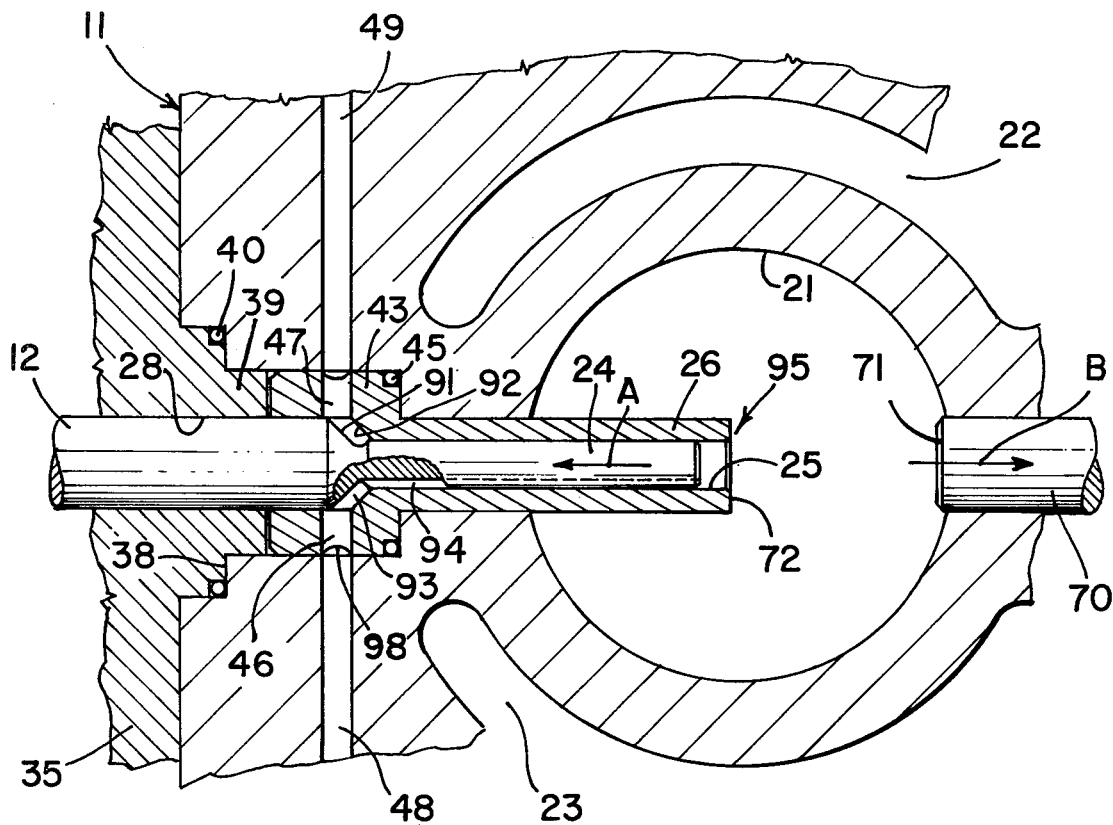
FIG. 3 is an enlarged fragmentary side-elevation, similar to FIG. 2, depicting the valve in open position providing additive flow to the main stream.

With reference now to both FIGS. 2 and 3, the passage of the injected additive through the valve body 11 shall be described. In the closed position of FIG. 2, the additive ingredient can enter the passageway 48 in valve body 11 from pipe 52. Upon entering the port 46 in primary valve seat 26, the flow is effectively sealed by the primary valve stem 12. A valve seating surface, indicated generally by the numeral 90, is presented between the valve stem 12 and valve seat 26, which seat is spaced from the inner end of the valve seat 26.

In FIG. 3, the primary valve stem has been retracted, in the direction of the arrow A, by turning the handle 30 forming a direct communication between the port 46 and bore 25. By so doing, a conical surface 91 on the stem 12 is presented to the additive in the port 46. A mating conical surface 92, in the seat 26 and communicable with the radial port 46, permits flow of the additive ingredient into a recess 93 then extant between surfaces 91 and 92. Once within the recess 93, the main part of the additive flows along a longitudinal flow channel 94, formed by the geometry of the reduced diamater valve plug extension 24 and the bore 25 in valve seat 26.

In order to feed the additive stream directly into the center of the main process stream, the secondary valve stem 13 is also retracted, in the direction of the arrow B, by turning the handle 75 for stem 13 preferably to the extent that seating surface 71 is substantially flush with the surface of lumen 21 (as seen in FIG. 3) to minimize flow restriction of the main process stream in lumen 21. Prior to the withdrawal of valve stem 13, a second, independent valve seat, indicated generally by the numeral 95, exists between the seating surface 71 of the valve plug tip and the end seat portion 72 of primary valve seat member 26. This valve seat 95 is immersed in the main process flow stream and therefore, when it is opened, the additive ingredient is injected directly into the center of the stream.

Should removal of the primary valve stem 12 become necessary to clear a clogged condition occurring along the flow channel 94 to the second valve seat 95, the operator need only engage the seat 95 by screwing the secondary valve 13 back against the end seat portion 72 of primary valve seat 26. Cut-off of the additive injection supply stream is readily facilitated by closing a conventional valve, depicted schematically in FIG. 1 and indicated by the numeral 96, preferably located in the feed line 52. At this time the cap screws 68 are removed and the primary valve stem 12, with the primary yoke 16 and the handle 30 still attached thereto, is withdrawn through the valve packing 56 and the packing follower 19. Because of the seat 95, the primary process stream cannot escape from the lumen 21 into bore 25 and therefore, interrupting the flow of this stream is not required. Once the clogged condition has been eliminated, the valve stem 12 can be replaced and injection can again be started.

By employing additional feed lines, such as line 53, a greater quantity of the injected additive or different additive can be fed to the conical recess 93 within valve seat 26. Feed and termination of additive via line 53 would be identical to the operation described in conjunction with line 52. Employing additional feed lines with a vent valve 97 in one or more of the lines renders possible the selective purging of contaminants such as air, gas, cleaning solvents or other foreign matter such that they do not enter the main process flow stream in lumen 21. The passageways 48, 49, ports 46, 47, and recess 93 may all be so purged by supplying additive through feed line 52 with the valve seat 95 closed and the valve seat 90 open, thereby forcing such contaminants through the vent valve 97. In addition it can be readily appreciated that two or more valves 10 could be positioned along a main process stream to permit uninterrupted flow of the primary process stream having the desired additive even with one valve 10 closed to remedy clogging or for other maintenance.

Although, as shown, the valve 10 provides for injection of additive ingredients substantially at the center of the main process stream, the actual point of injection is infinitely variable along the diameter of the lumen 21 merely by appropriately altering the lengths of the valve seat member 26, the valve plug extension 24 and the valve stem 13, respectively, the desired distance, forming the internal valve seat 95 at the desired point.

Irrespective of the point of introduction of the additive to the main process stream, the passageways provided in the primary valve seat and along the primary valve plug extension permit injection at a relatively high velocity thereby reducing the possibility of the reverse-flow migration of the main process stream into the additive injection stream. Where reverse-flow migration may not be a problem, the valve extension 24 could be eliminated, in which instance the additive stream would fill the bore 25. Control of the additive flow would remain at seats 90 and 95.

Thus, it should be evident that the novel additive injection valve disclosed herein carries out the objects of the invention set forth hereinabove in that it provides for the injection of an additive stream of streams directly into the flow of a main process stream, at any desired point along the diameter thereof, and also provides for the complete removal of the additive injection valve without requiring interruption to the flow of the main process stream. As will be apparent to those skilled in the art, modifications can be made without departing from the spirit of the invention herein disclosed and described, the scope of the invention being limited solely by the scope of the attached claims.

I claim:

1. A valve for the introduction of an additive to a main process stream lumen provided therein comprising, a valve body embodying the lumen, seating means in said valve body having a bore communicable with the lumen, a first valve stem in said bore in said seating means, a second valve stem movable relative to said seating means for opening and closing said bore in said seating means, port means in said seating means communicable with said bore to permit flow of the additive into said bore, said first valve stem adapted when reciprocated selectively to open and close said port means, means for moving said first valve stem whereby the additive flows through said port means into said bore, and means for moving said second valve stem for selectively opening said bore to inject the additive into the lumen.

2. A valve, as set forth in claim 1, wherein said first valve stem comprises, a cylindrical shaft which seals said port means and a conical surface directing flow of the additive from said port, said port means being radially disposed of said bore.

3. A valve, as set forth in claim 2, having a seat outside of the main process stream lumen formed at the entrance of said port means into said bore, said seat being closed by said cylindrical shaft and being open to said conical surface of said first valve stem.

4. A valve, as set forth in claim 3, wherein said second valve stem comprises, a cylindrical shaft having a tip forming with the end portion of said seating means a seat inside of the main process stream lumen.

5. A valve, as set forth in claim 4, wherein said first valve stem further comprises, an extension of reduced diameter extending from said conical surface into said bore in said seating means and having a flow channel of reduced cross-sectional area for additive flow.

6. A valve, as set forth in claim 5, wherein said bore in said seating means has a first diameter portion communicable with said cylindrical shaft, a second diameter portion communicable with said extension, and a conical surface separating said first and second diameter portions.

7. A valve, as set forth in claims 2 or 6, further comprising, a valve bonnet carrying said first valve stem and securing said seating means within said first valve body, a yoke mounted on said valve bonnet for support of said first valve stem, and a packing follower carried within said valve bonnet.

8. A valve, as set forth in claim 7, further comprising, a secondary valve bonnet carrying said second valve stem, a secondary yoke mounted on said secondary valve bonnet for support of said second valve stem, and a secondary packing follower carried within said secondary valve bonnet.

9. A valve, as set forth in claim 1, wherein said valve body is provided with at least one passageway disposed about the main process stream lumen for the circulation of suitable medium therethrough to control temperature of the main process stream.

10. A valve, as set forth in claim 1, wherein said first valve stem is removable from said bore in said seating means for cleaning while said second valve stem closes said bore in said seating means to allow uninterrupted flow of the main process stream.

11. A valve, as set forth in claim 1, wherein passageways supply the additive to said port means.

12. A valve, as set forth in claim 11, having at least two passageways, one of said passageways connected to a vent valve for selective purging of contaminants from said port means and said passageways.

* * * * *

UNITED STATES PATENT AND TRADEMARK OFFICE
CERTIFICATE OF CORRECTION

PATENT NO. : 4,195,654
DATED : April 1, 1980
INVENTOR(S) : Ralph J. Coley

It is certified that error appears in the above-identified patent and that said Letters Patent are hereby corrected as shown below:

Column 1, line 66
"invetion" should read -- invention --

Column 2, line 8
"invetion" should read -- invention --

Column 2, line 20
"ouside" should read -- outside --

Column 3, line 23
"disosed" should read -- disposed --

Column 6, line 28
"stream of streams" should read -- stream or streams --

Signed and Sealed this

Second Day of December 1980

[SEAL]

Attest:

SIDNEY A. DIAMOND

Attesting Officer

Commissioner of Patents and Trademarks